June 12, 1928.
W. A. MARTIN
1,673,576
COTTON BOLL PULLER
Filed Dec. 10, 1926
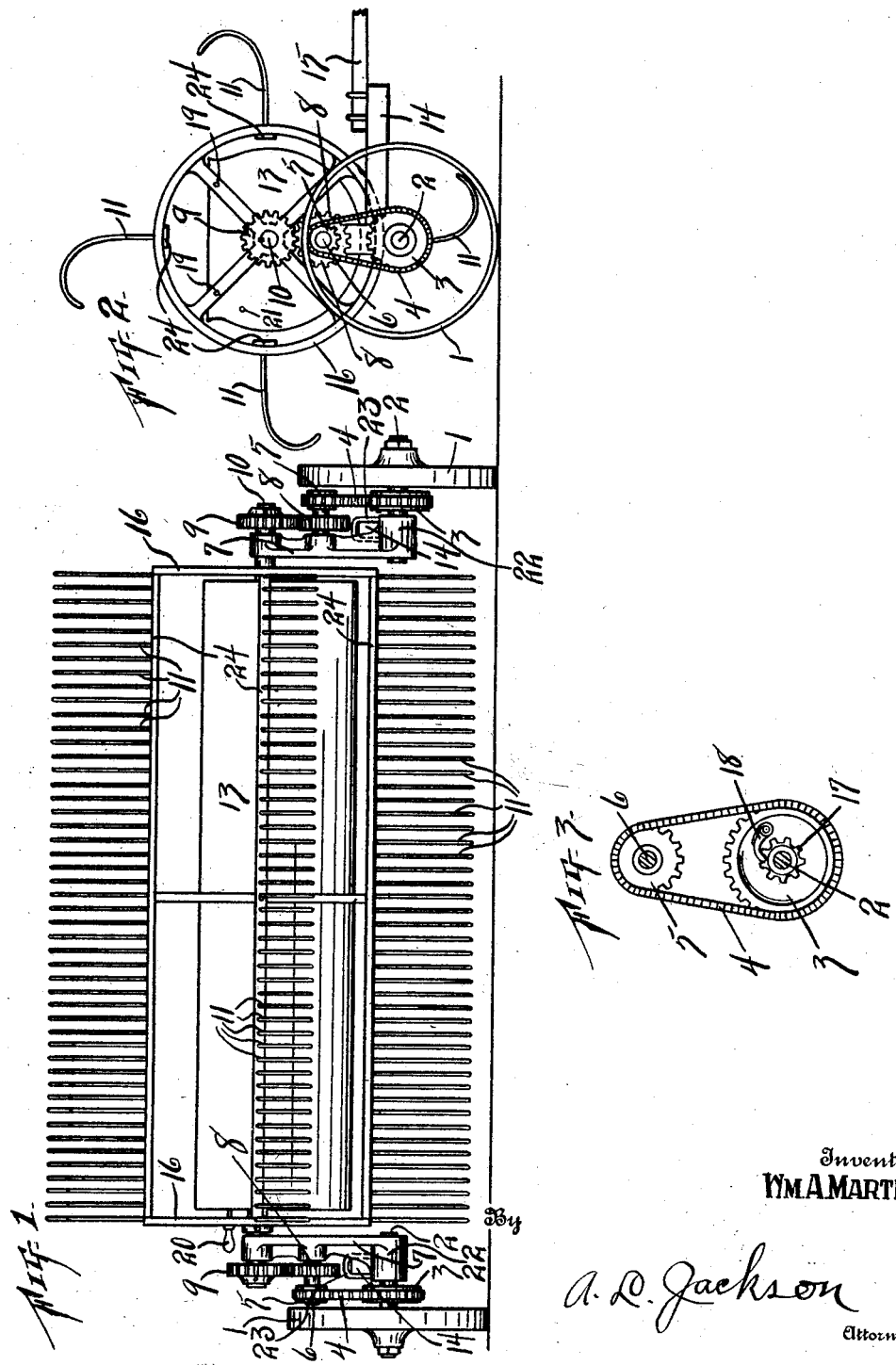
Inventor
WM. A. MARTIN.
By A. D. Jackson
Attorney Patented June 12, 1928.

1,673,576

UNITED STATES PATENT OFFICE.

WILLIAM A. MARTIN, OF FORT WORTH, TEXAS, ASSIGNOR OF FIFTY PER CENT TO JAMES R. NELSON, OF GRANDVIEW, TEXAS.

COTTON-BOLL PULLER.

Application filed December 10, 1926. Serial No. 153,987.

My invention relates to cotton harvesters and more particularly to machines for gathering the open cotton bolls or bolls partly open and other bolls that may contain fully developed cotton fibre; and the object is to provide a more economical way of harvesting cotton to meet the conditions being developed in view of the low price of cotton. Machines are now perfected for extracting cotton hulls from the seed cotton and the system of gathering cotton is being changed and the practice is going on at the present time. Instead of the workmen or cotton pickers attempting to remove the cotton from the bolls, they pull the entire bolls, cotton and hulls all together. Gin plants are equipped with machinery for extracting the hulls prior to delivering the cotton to the gin stands. The object of this invention is to provide a machine by which cotton of one or more rows can be gathered at a single trip across the field in the direction of the rows of cotton. Other objects and advantages will be fully explained in the following description and the invention will be more particularly pointed out in the claims.

Reference is had to the accompanying drawings which form a part of this application.

Fig. 1 is a rear elevation of the cotton harvester.

Fig. 2 is a side elevation of the machine.

Fig. 3 is a detail view of the driving gear.

Similar characters of reference are used to indicate the same parts throughout the several views.

The machine is provided with supporting and driving wheels 1 which carry an axle 2 which is of stub-shaft type, there being a stub shaft for each wheel. Frame members 7 are supported on the stub-shafts 2. A shaft 10 for the gathering reel 16 is journaled in the frame members 7 which have hubs or bearings for the shafts 2. Draft bars 14 are provided and held in sockets cast on the hubs 22. The bars 14 may be secured in the sockets 23 in any suitable manner. A tongue 15 is operatively connected to the bars 14.

Means are provided for driving the reel 16 from the wheels 1. Sprocket wheels 3 are rigid on the stub shafts 2 and turn as the wheels 1 are turned. Stub-shafts 6 are journaled in frame members 7 and wheels 5 are rigid with shafts 6 and the sprocket wheels 5 are driven by chains 4 from wheels 3. Spur gear wheels 8 are rigid with shafts 6 and mesh with spur gear wheels 9 which are rigid with the shaft 10 and are driven by the wheels 8. With the gearing thus described the reel 16 is driven in the opposite direction to the wheels 1 which operation is necessary for the reel 16 to accomplish the gathering of the cotton bolls and cotton.

The reel 16 is provided with a plurality of fingers 11 for gathering the cotton bolls. Four sets of fingers 11 are provided and these fingers are secured to bars 24 which are attached to the end members 16. The fingers 11 are positioned close enough to gather all bolls of an appreciable size. The wheels 1 are far enough apart for gathering cotton from one, two, three, or more rows at one trip across the field.

The cotton and bolls are dumped by the fingers 11 into a trough or receptacle 13 which is hung loosely on collars which are supported on the reel 16. From time to time the cotton and bolls will be removed and placed in a wagon or other vehicle to be hauled away. In order to prevent the reel 16 from being turned in the opposite direction from that stated above, ratchet wheels 17 are attached to the stub-shafts 2 and pawls 18 are attached to the wheels 3 to prevent backward turning of the wheels 3 on the shafts 2.

Means are provided for turning the receptacle 13 for dumping the contents thereof. The receptacle 13 is provided with a small hole 21 into which may be inserted a pin or handle 20 for turning the receptacle, or holes 19 may be made in the arms of the frame 16 so that the receptacle 13 may be attached temporarily to the frame 16 by inserting the pin 20 through the arms and into the holes 21. When the contents of the receptacle 13 are dumped the pin 20 is removed.

What I claim as new, is:—

1. A cotton harvesting machine comprising supporting and driving wheels and stub shafts carried thereby, a frame supported on said wheels, a shaft journaled in said frame, gearing for driving said shaft from said stub shafts, a reel rigid with said shaft and stripping fingers spaced apart and rigid with said reel, and a trough hung loosely on said shaft for receiving the cotton and hulls stripped from said fingers.

2. A cotton harvester comprising supporting and driving wheels and stub shafts carried thereby, a frame supported on said stub shafts, a shaft journaled in said frame, gearing driven from said wheels for driving said shaft in the opposite direction from the turning of said wheels, a reel rigid with said shaft, fingers attached to said reel and curved backwardly at their outer ends and spaced apart, and a trough hung loosely on said shaft for receiving the cotton and bolls gathered by said fingers.

3. A cotton harvesting machine comprising supporting and driving wheels and stub shafts carried thereby, a frame supported on said stub shafts, a reel shaft journaled in said frame, stub shafts journaled in said frame, sprocket gearing for driving the latter stub shafts from the former stub shafts, spur gearing for driving said reel from said second mentioned stub shafts, a reel rigid with said reel shaft, fingers attached to said reel and spaced apart and curved backward at their outer ends, and a trough hung loosely from said reel shaft for receiving cotton and bolls from said fingers.

4. A cotton harvesting machine comprising supporting and driving wheels and stub shafts carried and driven thereby, a frame supported on said stub shafts, a reel shaft journaled in said frame, gearing for driving said reel shaft from said stub shafts, a reel rigid with said reel shaft and cotton stripping fingers carried thereby and curved backwardly at their outward ends, said reel being driven in the opposite direction from the turning of said supporting wheels, and means for preventing the turning of said reel in the same direction as the turning of said supporting wheels.

In testimony whereof, I set my hand, this 24 day of June, 1926.

WILLIAM A. MARTIN.